(12) United States Patent
Nozaki

(10) Patent No.: US 12,714,091 B2
(45) Date of Patent: Aug. 25, 2026

(54) POLYAMIDE COMPOSITIONS

(71) Applicant: DUPONT POLYMERS, INC., Wilmington, DE (US)

(72) Inventor: Masahiro Nozaki, Utsunomiya (JP)

(73) Assignee: Celanese Polymers Holding, Inc., Wilmington, DE (US)

( * ) Notice: Subject to any disclaimer, the term of this patent is extended or adjusted under 35 U.S.C. 154(b) by 900 days.

(21) Appl. No.: 17/996,546

(22) PCT Filed: Apr. 29, 2021

(86) PCT No.: PCT/US2021/029856
§ 371 (c)(1),
(2) Date: Oct. 19, 2022

(87) PCT Pub. No.: WO2021/222539
PCT Pub. Date: Nov. 4, 2021

(65) Prior Publication Data

US 2023/0220201 A1 Jul. 13, 2023

Related U.S. Application Data

(60) Provisional application No. 63/017,328, filed on Apr. 29, 2020.

(51) Int. Cl.
*A01M 31/02* (2006.01)
*C08L 77/06* (2006.01)
(Continued)

(52) U.S. Cl.
CPC ............ *A01M 31/02* (2013.01); *C08L 77/06* (2013.01); *B29C 45/0001* (2013.01);
(Continued)

(58) Field of Classification Search
CPC ............................... A01M 31/02; C08L 77/06
See application file for complete search history.

(56) References Cited

U.S. PATENT DOCUMENTS 8,304,064 B2 11/2012 Takeyama et al.
8,957,142 B2 2/2015 Hong et al.
(Continued)

FOREIGN PATENT DOCUMENTS

CN 102115593 A 7/2011
CN 102153857 A 8/2011
(Continued)

OTHER PUBLICATIONS

Property Characterization of PA10T/PA6T/66 Alloy with Different Ratio, China Plastics Industry, pp. 50-52, May 31, 2014—See Abstract.

(Continued)

*Primary Examiner* — John E Uselding

(57) ABSTRACT

Provided herein are polyamide compositions having desirable flow properties, for example low viscosity, which is useful for molding small components. The polyamide compositions comprise a polyamide comprising 1,10-decanediamine terephthalamide (10T) repeating units; a copolyamide comprising repeating units derived from terephthalic acid and from a diamine containing 6 or fewer carbon atoms; a reinforcing agent; and optionally, one or more of a flame retardant, a flame retardant synergist, and a lubricant.

11 Claims, 3 Drawing Sheets

(51) Int. Cl.

| | |
|---|---|
| *B29C 45/00* | (2006.01) |
| *B29C 45/27* | (2006.01) |
| *B29K 77/00* | (2006.01) |
| *B29K 105/00* | (2006.01) |
| *H01R 13/527* | (2006.01) |
| *H01R 43/18* | (2006.01) |

(52) U.S. Cl.
CPC ...... *B29C 45/2708* (2013.01); *B29K 2077/00* (2013.01); *B29K 2105/0026* (2013.01); *C08L 2201/02* (2013.01); *C08L 2205/025* (2013.01); *H01R 13/527* (2013.01); *H01R 43/18* (2013.01)

(56) References Cited

U.S. PATENT DOCUMENTS

| | | | | |
|---|---|---|---|---|
| 9,815,981 | B2 | 11/2017 | Aepli | |
| 9,879,127 | B2 | 1/2018 | Mii et al. | |
| 9,969,882 | B2 | 5/2018 | Thomas et al. | |
| 10,683,418 | B2 | 6/2020 | Thomas et al. | |
| 2001/0003762 | A1 | 6/2001 | Miyabo | |
| 2014/0221529 | A1 | 8/2014 | Hong et al. | |
| 2015/0175804 | A1* | 6/2015 | Aepli | C08K 5/5313 524/100 |
| 2015/0284484 | A1 | 10/2015 | Zhou et al. | |
| 2017/0022349 | A1 | 1/2017 | Mii et al. | |
| 2019/0002638 | A1 | 1/2019 | Zhang et al. | |

FOREIGN PATENT DOCUMENTS

| | | | |
|---|---|---|---|
| CN | 102321361 | A | 1/2012 |
| CN | 103160104 | A | 6/2013 |
| CN | 105492536 | A | 4/2016 |
| EP | 3 375 821 | A1 | 9/2018 |
| JP | S 6166624 | A | 4/1986 |
| JP | 2003011284 | A | 1/2003 |
| JP | 2007070609 | A | 3/2007 |
| JP | 2008045905 | A | 2/2008 |
| JP | 2013001906 | A | 1/2013 |
| JP | 2013064091 | A | 4/2013 |
| WO | WO 2019/060117 | A1 | 3/2019 |

OTHER PUBLICATIONS

International Search Report and Written Opinion for PCT/US2021/029856 dated Aug. 5, 2021, 9 pages.

Ellis, Thomas S., "Influence of Structure on Phase Behavior of Polyamide Blends," *Macromolecules*, 1991, 24, pp. 3845-3852.

* cited by examiner

Fixed Mold
Cooling Pipe
Φ6
(48)
202
Φ3.0
2.0°
47
0.2
2.02
20
Parting Line
P/L
2.5
10
6.28
Gas Vent
100
2
Φ4
8
|48|
Φ6
Cooling Pipe
Movable Mold 5.0
100
14
E/P
Ejector Pins

POLYAMIDE COMPOSITIONS

CROSS-REFERENCE TO RELATED APPLICATION

This application claims priority to U.S. Provisional Appln. No. 63/017,328, filed on Apr. 29, 2020, which is incorporated herein by reference in its entirety.

FIELD OF THE INVENTION

The present invention relates to polyamide compositions having desirable flow properties, for example low viscosity, which is useful for molding small components. Flame retardant polyamide compositions useful for providing small, flame retardant molded components are further provided.

BACKGROUND OF THE INVENTION

Several patents and publications are cited in this description in order to more fully describe the state of the art to which this invention pertains. The entire disclosure of each of these patents and publications is incorporated by reference herein.

Polyamide resins possess excellent mechanical properties, moldability, and chemical resistance and have therefore been used in automotive parts, electric/electronic components, mechanical components, and many other applications. Articles made from polyamide resins can possess extremely desirable physical properties. However, for the molding of small and complex articles, it is desirable that polyamide resin compositions have high flowability. Flowability refers to the melt viscosity of a resin, and its ability to flow through narrow or complicated shapes.

WO2019/060117A describes a polyamide composition comprising semi-aromatic polyamide, flame retardant, lubricant, inorganic reinforcing agent.

US2001/0003762A describes a polyamide resin composition comprising an aliphatic polyamide and a metal oxide.

It has now been discovered that polyamide compositions comprising a specific mixture of polyamides provide high flowability with desirable physical properties for use in applications including, but not limited to, electrical connectors.

SUMMARY OF THE INVENTION

Accordingly, provided herein are polyamide compositions comprising: (A) 10 to 80 wt % of a polyamide comprising 1,10-decanediamine terephthalamide (10T) repeating units; (B) 0.5 to 40 wt % of a copolyamide comprising repeating units derived from terephthalic acid and from a diamine containing 6 or fewer carbon atoms; (C) 0 to 25 wt % of a flame retardant; (D) 0 to 5 wt % of at least one flame retardant synergist; (E) 1 to 40 wt % of a reinforcing agent; (F) 0 to 2 wt % of a lubricant; and (G) 0 to 25 wt % of one or more additional additives, wherein the weight percentages are based on the total weight of the polyamide composition; and wherein the sum of the weight percentages of each of components (A), (B), (C), (D), (E), (F), and (G) totals 100 wt %.

DETAILED DESCRIPTION OF THE INVENTION

Abbreviations

Figures 1, 1A:
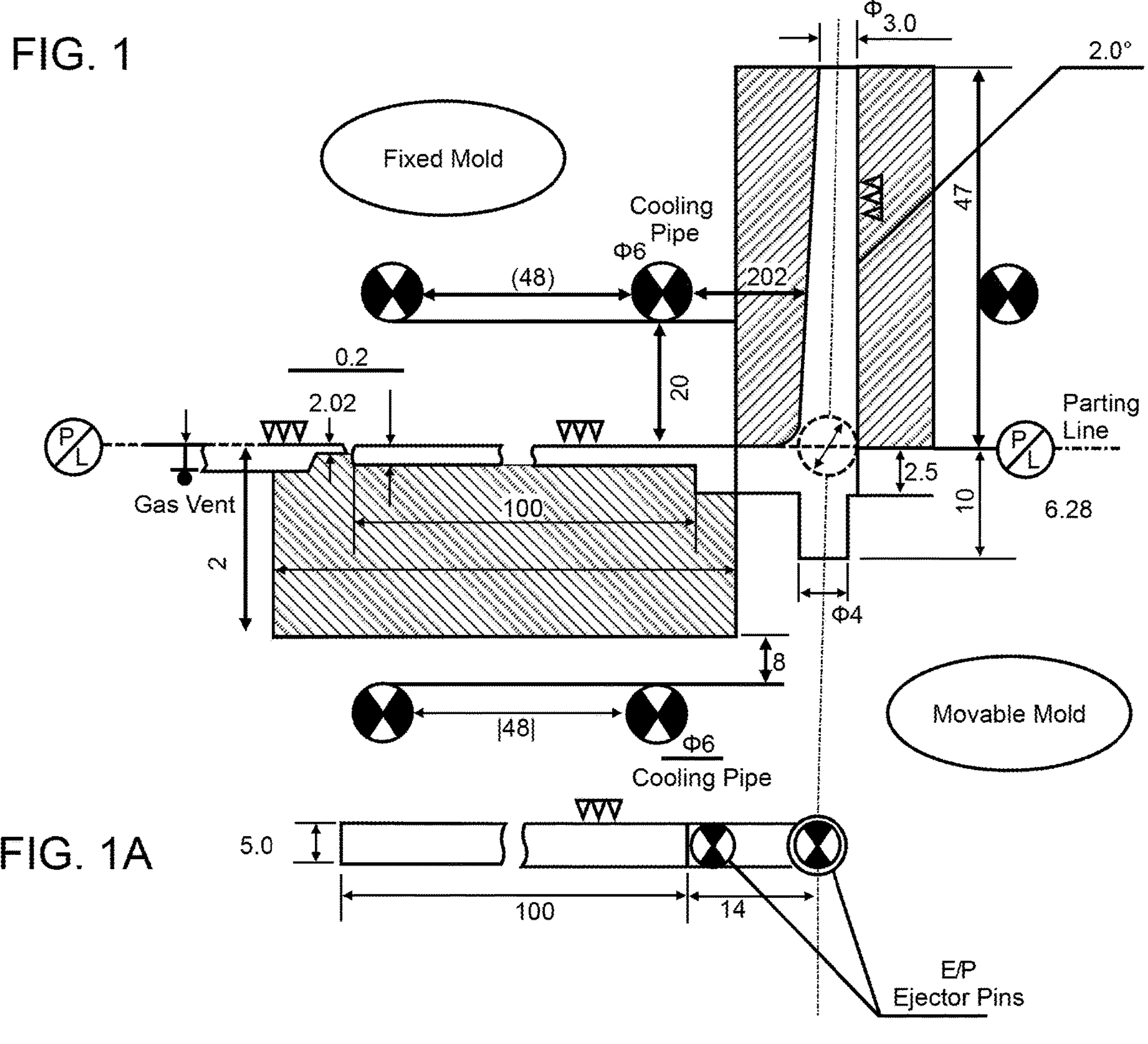
FIGS. 1 and 2 are schematic diagrams of the molding apparatus used to determine flowability, shown in cross-sectional view through a vertical plane.
FIGS. 1A and 2A are cross-sectional views through a horizontal plane of the molding apparatus depicted in FIG. 1.
Figures 2, 2A:
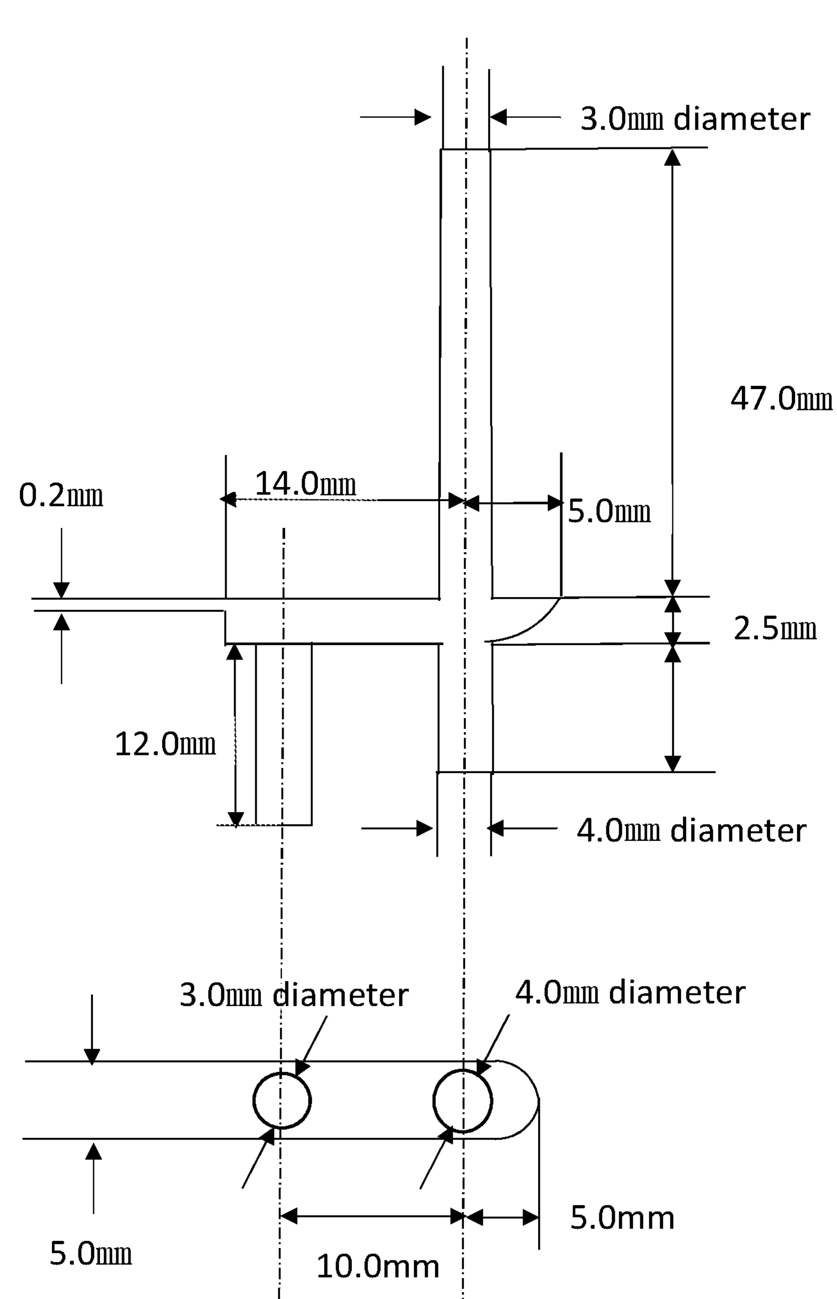

The claims and description herein are to be interpreted using the abbreviations and definitions set forth below.

"%" refers to the term percent.

"wt %" refers to weight percent.

"mm" refers to millimeters.

"MPa" refers to megapascal

"mp" refers to melting point

"° C." refers to degrees centigrade

"mol %" refers to mole percent

"IV" refers to inherent viscosity.

Definitions

As used herein, the article "a" refers to one as well as more than one and does not necessarily limit its referent noun to the grammatical category of singular number.

Unless expressly stated to the contrary in limited circumstances, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present).

As used herein, the term "article" refers to an item, thing, structure, object, element, device, etc. that is in a form, shape, configuration that is suitable for a particular use or purpose without further processing of the entire entity or a portion of it.

As used herein, the term "repeat unit" refers to part of a polymer whose repetition would produce the complete polymer chain. For example, for polyamide 66 the repeat unit is an adipic acid monomer bonded to a hexamethylenediamine monomer such that the repeat unit is adipic acid-hexamethylenediamine bonded together by an amide linkage. The resulting polymer is hexamethylene adipamide.

As used herein, the term "polymer resin" refers to the neat polymer used in the polymer compositions and only comprises the polymer chain produced from the respective monomers. Stated alternatively, no additional additives are present in the polymer resin.

As used herein, the terms "flowability" and "flow characteristics" as applied to polymers refer to the capability of a molten polymer to move by flow, typically under pressure. Flowability is measured by the following properties, among others: melt flow index, flow length, snake flow, and apparent capillary melt viscosity.

As used herein, the term "polyamide composition" refers to a mixture of at least two different polyamide resins and, optionally, any additional materials combined with the polyamide composition, such as, for example, lubricants, reinforcing agents, flame retardants, and flame retardant synergists.

Ranges and Preferred Variants

Any range set forth herein expressly includes its endpoints unless explicitly stated otherwise. Setting forth an amount, concentration, or other value or parameter as a range specifically discloses all possible ranges formed from any possible upper range limit and any possible lower range limit, including any pair of real numbers within the recited range inclusive of its endpoints, regardless of whether such pairs of upper and lower range limits are expressly disclosed herein. Compounds, processes and articles described herein are not limited to specific values disclosed in defining a range in the description.

The use of numerical values in the various ranges specified in this application, unless expressly indicated otherwise, are stated as approximations as though the minimum and maximum values within the stated ranges were both preceded by the word "about". In this manner, slight variations above and below the stated ranges can be used to achieve substantially the same results as values within the ranges. Also, the disclosure of these ranges is intended as a continuous range including the minimum and maximum values and each and every real value between the minimum and maximum values.

The disclosure herein of any variation in terms of materials, chemical entities, methods, steps, values, or ranges, etc.—whether identified as preferred or not—of the processes, compounds and articles described herein specifically intends to include any possible combination of materials, methods, steps, values, ranges, etc. For the purpose of providing photographic and sufficient support for the claims, any disclosed combination is a preferred variant of the processes, compounds, and articles described herein.

Generally

Provided herein are novel polyamide compositions that exhibit desirable flow characteristics. These polyamide compositions include one or more flame retardants, for example phosphinate flame retardants, disphosphinate flame retardants, or both phosphinate and disphosphinate flame retardants; one or more reinforcing agents: and optionally one or more other components to provide polyamide compositions exhibiting flow characteristics that allow for the manufacture of complex parts having flame retardant and other desirable properties.

Also provided herein are articles prepared from these polyamide compositions and processes for preparing these polyamide compositions.

Specifically, provided herein are polyamide compositions comprising: (A) 10 to 80 wt % of a polyamide comprising 1,10-decanediamine terephthalamide (10T) repeating units; (B) 0.5 to 40 wt % of a copolyamide comprising repeating units from terephthalic acid and from a diamine containing 6 or fewer carbon atoms; (C) 0 to 25 wt % of a flame retardant; (D) 0 to 5 wt % of at least one flame retardant synergist; (E) 1 to 40 wt % of a reinforcing agent; (F) 0 to 2 wt % of a lubricant; and (G) 0 to 25 wt % of one or more additional additives, wherein the weight percentages are based on the total weight of the polyamide composition, and the sum of the weight percentages of each of components (A), (B), (C), (D), (E), (F), and (G) totals 100 wt %.

Polyamide Compositions

The polyamide compositions described herein surprisingly exhibit desirable flowability, which is especially desirable during molding of articles. When a specific polyamide (A) comprising 1,10-decanediamine terephthalamide (10T) repeating units is used in combination with a copolyamide (B) comprising repeating units from terephthalic acid and a diamine containing 6 or fewer carbon atoms, the resulting polyamide composition exhibits desirable flow characteristics. Specifically, these favorable properties are obtained when the 10T polyamide has a melt flow rate (MFR) ranging from about 40 to about 80 g/10 min, the polyamide composition comprises PA 6T/610 or PA 6T/612 as copolyamide (B), and the ratio of polymer (B) to the total polyamide polymer (polymer (A)+copolymer (B)) calculated as weight % preferably ranges from 1 to 50, from 3 to 40, or more preferably from 5 to 30. Preferred polyamide blends exhibit a bar flow that is at least 5%, at least 7%, at least 10%, at least 15%, at least 20%, at least 25%, or at least 30% greater than that of an otherwise identical polyamide composition which does not comprise the copolyamide (B).

Stated alternatively, an otherwise identical polyamide composition, processed identically in an identical mold, in which the only difference is that an equivalent amount of copolyamide(s) (A) is substituted for the copolyamide(s) (B) described herein, may have a bar flow that is about 95% or less than that of the polyamide composition described herein. Preferably, the otherwise identical polyamide composition has a bar flow that is about 93% or less, about 90% or less, about 85% or less, about 80% or less, about 75% or less, or about 70% or less than that of the polyamide composition described herein.

Without being bound by theory, it is believed that the presence of copolyamide (B) in a specific concentration range interrupts the crystallization of polyamide (A), thus decreasing the freezing point or the crystallization temperature of polyamide (A) and increasing flowability of the polyamide composition.

These polyamide compositions, when combined with flame retardants or reinforcing agents, unexpectedly maintain desirable flowability and further exhibit good flame retardancy, tensile modulus, and impact modulus properties.

Polyamide (A)

The polymer compositions described herein may include one or more polyamides (A). Suitable polyamides (A) for use in the polyamide compositions described herein comprise repeat units derived from 1,10-decanediamine terephthalamide (10T). The polyamide (A) may be a 10T homopolymer.

Alternatively, it may be a copolyamide formed from 10T repeating unit and other repeating units, such as 1,10-decanediamine decanediamine (1010) to form PA10T1010 or 1,10-decanediamine dodecanediamine (1012) to form PA10T1012. When polyamide (A) is a copolyamide, the content of the 10T repeating unit is from 40 up to but not including 100 wt %, preferably from 50 up to but not including 100 wt %, based on the total weight of the copolyamide, wherein the sum of the weight percentages of all the repeating units in the polyamide or copolyamide is 100 wt %.

The MFR of the polyamide (A) is from about 5 to about 80 g/10 min, preferably from about 40 to about 80 g/10 min measured according to ISO 1133-1:2011.

The amount of polyamide (A) in the polyamide composition ranges from about 10 to 80 weight percent, preferably from about 20 to 70, and more preferably from about 25 to 65 weight percent based on the total weight of components (A), (B), (C), (D), (E), (F), and (G) in the polyamide composition.

Copolyamide (B)

The polymer compositions described herein may include one or more copolyamides (B). Suitable copolyamides (B) for use in the polyamide compositions described herein comprise repeating units derived from a diamine containing 6 or fewer carbon atoms and repeating units derived from terephthalic acid. The number of carbon atoms of the diamine is preferably 6 or 5. The copolyamide (B) further comprises one or more other repeating units. For example, hexamethylene adipic acid may be copolymerized, to form PA6T66 or PA5T66; hexamethylene decanediamide may be copolymerized, to form PA6T610 or PA5T610; and hexamethylene dodecanediamide may be copolymerized, to form PA6T612 or PA5T612. Copolymers of PA6T or PAST with hexamethylene isophthalic acid (PA6T61 or PA5T61) are also suitable for use as copolyamide (B). The content of PAST or PA6T repeating units in suitable copolyamides (B) is about 20 to about 75 or 80 mole percent or from about 40% to about 60%, preferably from about 45 to about 70 mole percent, based on the total number of moles of repeating units in the copolyamide (B). These mole percentages may also be represented as a range of molar ratios, specifically from 20/80 to 80/20 or 75/25, or from 45/55 to 70/30, or from 60/40 to 40/60, wherein the numerator is the mole percentage of 6T or 5T and the denominator is the mole percentage of other copolymerized repeating unit(s) in copolyamide (B), and wherein the sum of the mole percentages of all the repeating units in copolyamide (B) is 100 mol %.

The weight percent of copolyamide (B) in the polyamide compositions described herein ranges from about 0.5 to 40 weight percent, preferably from 1.5 to 30 weight percent, based on the total weight of the polyamide composition.

Flame Retardants (C)

The polyamide compositions may optionally further comprise one or more flame retardants (C), which are phosphorus-based flame retardants selected from the group consisting of phosphinates of formula (1), disphosphinates of formula (11), and combinations of two or more of these:

(I)

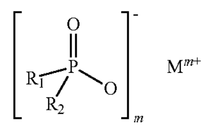

(II)

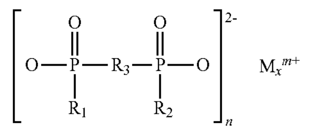

wherein $R_1$ and $R_2$ are independently selected from hydrogen, a linear, branched, or cyclic $C_1$-$C_6$ alkyl group, or a $C_6$-$C_{10}$ aryl; $R_3$ being a linear or branched $C_1$-$C_{10}$ alkylene group, a $C_6$-$C_{10}$ arylene group, a $C_6$-$C_{12}$ alkyl-arylene group, or a $C_6$-$C_{12}$ aryl-alkylene group; M being selected from the group consisting of calcium ions, aluminum ions, magnesium ions, zinc ions, antimony ions, tin ions, germanium ions, titanium ions, iron ions, zirconium ions, cerium ions, bismuth ions, strontium ions, manganese ions, lithium ions, sodium ions, potassium ions and combinations of two or more thereof; m, n, and x are equal to 1, 2, 3 or 4; and m, n, and x are the same or different.

Preferably, the at least one phosphorus-based flame retardant is selected from the group consisting of aluminum diethylphosphinate, aluminum methylethylphosphinate, zinc diethylphosphinate, zinc methylethylphosphinate, aluminum isopropylisobutylphosphinate, aluminum isopropyltertbutylphosphinate, aluminum diisobutylphosphinate, and combinations of two or more of these.

When present, in the polyamide compositions described herein, the weight percentage of flame retardant(s) (C) ranges from about 5 to 25 weight percent, preferably from 5 to 20 weight percent, based on the total weight of the polyamide composition.

Flame Retardant Synergist (D)

The polyamide compositions may optionally further comprise one or more flame retardant synergists (D). Suitable flame retardant synergists for use in the polyamide compositions include for example metal oxides such as silicon dioxide, boehmite, aluminum oxide, iron oxide, titanium oxide, manganese oxide, magnesium oxide, zirconium oxide, zinc oxide, molybdenum oxide, cobalt oxide, bismuth oxide, chromium oxide, tin oxide, antimony oxide, nickel oxide, copper oxide and tungsten oxide. Other suitable flame retardant synergists include, without limitation, metal powders such as aluminum, iron, titanium, manganese, zinc, molybdenum, cobalt, bismuth, chromium, tin, antimony, nickel, copper and tungsten. Flame retardant synergists including one or more metal salts such as barium metaborate, zinc carbonate, magnesium carbonate, calcium carbonate, zinc borate, zinc stannate, and barium carbonate are also suitable. Mixtures of two or more of any suitable flame retardant synergists may be used. Preferred flame retardant synergists include boehmite, aluminum oxide, zinc borate, and mixtures of two or more of these.

When present, the weight percentage of the flame retardant synergist(s) (D) in the polyamide compositions described herein ranges from about 0.1 to 10 weight percent, preferably from 0.5 to 10 weight percent, and more preferably from about 1 to 10 weight percent, based on the total weight of the polyamide composition.

Reinforcing Agents (E)

The polyamide compositions described herein include at least one reinforcing agent (E) for improving mechanical strength and other properties. The reinforcing agents may be a fibrous, tabular, powdery or granular material. Examples of suitable fibrous reinforcing agents include, without limitation, glass fibers, carbon fibers, gypsum fibers, ceramic fibers, asbestos fibers, zirconia fibers, alumina fibers, silica fibers, titanium oxide fibers, and silicon carbide fibers.

Suitable reinforcing agents may also be in powdery, granular or tabular form such as, for example, mica, talc, kaolin clay, silica, calcium carbonate, potassium titanate, glass beads, glass flakes, glass microballoons, wollastonite, montmorillonite, titanium oxide, zinc oxide, and graphite. The polyamide composition may include any combination of two or more reinforcing agents.

Preferred reinforcing agents include glass fibers, glass flakes, kaolin clay, wollastonite, mica, calcium carbonate, silica, carbon fibers, potassium titanate, and combinations of two or more of these.

The glass fiber, flake, or bead may be sized or unsized. Suitable glass fibers may be chopped strands of long or short glass fibers, and milled fibers of these.

The reinforcing agent may be processed on its surface with any known coupling agent (e.g., silane coupling agent, titanate coupling agent) or with any other surface-treating agent, such as, for example, corona treatment.

If used, fibers may have a circular or non-circular cross section. A fiber having a non-circular cross section refers to a fiber having a major axis lying perpendicular to a longitudinal direction of the fiber and corresponding to the longest linear distance in the cross section. The non-circular cross section has a minor axis corresponding to the shortest linear distance in the cross section in a direction perpendicular to the major axis. The non-circular cross section of the fiber may have a variety of shapes including a cocoon-type (figure-eight) shape; a rectangular shape; an elliptical shape; a semielliptical shape; a roughly triangular shape: a polygonal shape; and an oblong shape. As will be understood by those skilled in the art, the cross section may have other shapes. The ratio of the length of the major axis to that of the minor access is preferably between about 1.5:1 and about 6:1. The ratio is more preferably between about 2:1 and 5:1 and yet more preferably between about 3:1 to about 4:1. Suitable fibers having a non-circular cross section are described in EP Pat. No. 196194. The non-circular fibers may be long fibers, chopped strands, milled short fibers, or other suitable forms known to those skilled in the art.

When circular or non-circular fibrous reinforcing agents are used they may have essentially any diameter but preferably their diameter (cross-sectional) or average diameter ranges from about 1 micron to 20 microns, more preferably from about 5 microns to 20 microns.

The concentration of reinforcing agent(s) (E) in the polyamide compositions may range from about 1 to about 40 weight percent, preferably about 10 to about 40 weight percent, and more preferably about 20 to about 40 weight percent of the total weight of all ingredients (A) to (G) in the polyamide compositions.

Lubricants (F)

The polyamide compositions described herein may optionally further comprise one or more lubricants (F). Suitable lubricants include, without limitation, those selected from the group consisting of fatty acid amides and fatty acid metal salts (e.g. aluminum behenate).

Suitable fatty acids for preparing fatty acid metal salt lubricants comprise 10 to 30, 12 to 30, or 18 to 30 carbon atoms, preferably 18 to 28 carbon atoms, more preferably 22 to 28 carbon atoms. The fatty acid may comprise linear or branched carbon chains. Preferably, the fatty acid used comprises 18 to 28 carbon atoms in a linear carbon chain.

Examples of suitable fatty acids include stearic acid, erucic acid, oleic acid, montanic acid, and behenic acid, for example.

Examples of suitable fatty acid metal salts include aluminum behenate, sodium behenate, sodium montanate, aluminum montanite, calcium behenate, and calcium montanate, for example.

Examples of suitable fatty acid amides include, without limitation, methylenebehenylamide, ethylenebisbehenylamide, dioctadecyladipamide, dioctadecylsuccinamide, eruccamide, stearylamide, erucyl stearamide, and N-stearylerucamide.

Preferred lubricants which may be used in the polyamide compositions include calcium montanate, N-stearyl erucamide, N,N'-ethylene bisstearamide, and combinations of two or more of these.

Useful commercial lubricants for the polyamide compositions include Kemamide® E180 (N-stearylerucamide, CAS No. [10094-45-8]) available from PXC Biotech., Philadelphia, PA; Crodamide® 212 lubricant, a stearyl erucamide available from Croda Chemicals, Hull UK; Licomont® CaV 102 lubricant, a fine grain calcium montanate available from Clariant Corp.; Hostamont® NAV 101 lubricant, a sodium montanate manufactured by Clariant, Muttenz, Switzerland; aluminum distearate, a wax supplied by PMC Global, Inc. Sun Valley, CA, USA; and Acrawax® C lubricant, an N,N'-ethylene bisstearamide from Lonza Chemical Co. of Basel, Switzerland.

Combinations of two or more suitable fatty acids are also suitable for use as lubricant(s) (F).

When the lubricant(s) (F) are present, the polyamide compositions may comprise from 0.01 to 2 weight percent, preferably 0.05 to 1 weight percent, more preferably 0.1 to 0.5 weight percent of the lubricant(s) (F), based on the total weight of all ingredients in the polyamide composition.

Optional Additional Additives (G)

The polyamide compositions may optionally comprise one or more additional additives such as for example ultraviolet stabilizers, also known as UV absorbers; processing aids; release agents; nucleants; impact modifiers; colorants, including dyes and pigments such as for example carbon black and titanium dioxide; hydrolytic stabilizers; anti-static agents; heat stabilizers or antioxidants; and antiblock agents. The amount of each additive is individually selected, depending upon the desired properties of the polyamide composition.

In general, when the optional additional additive(s) are present, their total amount is from 0.01 to 20 wt %, or from 0.01 to 15 wt %, or from 0.01 to 10 wt %, or from 0.01 to 5 wt %, or from 0.01 to 2 wt %, or from 0.01 to 1 wt %, based on the total weight of the polyamide composition.

Carbon black is a preferred optional additional additive. When present, its amount is preferably from 0.01 to 5.0 wt %, 0.1 to 2.0 wt %, 0.1 to 1 wt %, or 0.1 to 0.5 wt %, 0.1 to 0.3 wt %, or about 0.1 wt %, based on the total weight of the polyamide composition.

Titanium dioxide is another preferred optional additional additive. When present, its amount is preferably from 0.01 to 20 wt %, 0.01 to 15 wt %, 0.01 to 10 wt %, 0.01 to 5.0 wt %, from 0.1 to 2.0 wt %, or from 0.1 to 1 wt %, based on the total weight of the polyamide composition.

Heat stabilizers, including organic and inorganic heat stabilizers, are also preferred optional additional additives. When the heat stabilizer is an organic heat stabilizer, it is also called an 'antioxidant'. Examples of suitable antioxidants are sterically hindered phenolic compounds, amine antioxidants such as aromatic secondary amines, phosphorus-based antioxidants, and copper-based heat stabilizers. Examples of sterically hindered phenols include, N,N'-hexane-1,6-diylbis(3-(3,5-di-tert.-butyl-4-hydroxyphenyl-propionamide)), pentaerythritol tetrakis(3-(3,5-di-tert-butyl-4-hydroxyphenyl)propionate); octadecyl-3-(3,5-di-tert.butyl-4-hydroxyphenyl)-propionate; 1,3,5-trimethyl-2,4,6-tris(3,5-di-tert-butyl-4-hydroxybenzyl)benzene; 2',3 bis [3,5-ditertiary butyl-4-hydroxyphenyl) propionyl]propionohydrazide; N,N' hexane-1,6-diylbis[3,5 ditertiary butyl-4-hydroxyphenyl propionamide, or the like. N,N'-hexane-1,6-diylbis(3-(3,5-di-tert.-butyl-4-hydroxyphenylpropionamide)) is preferred. Commercial examples of sterically hindered phenolic compounds include Irganox™ 1098 and Irganox™1010, available from BASF SE of Ludwigshafen, Germany.

Examples of aromatic secondary amine heat stabilizers include 4,4'-Bis (alpha, alpha-dimethylbenzyl) diphenylamine and 2,4-Bis(n-octylthio)-6-(4'-hydroxy-3,5-di-tbutylanilino)-1,3,5-tiazine. Examples of phosphorus-based antioxidants include tris(2,4-di-t-butylphenyl) phosphite; tris (nonylphenyl) phosphite; and diphenyl mono(tridecyl) phosphite. Ultranox™ 626 is a commercial example of a phosphorus-based antioxidant available from Addivant of Danbury, CT.

Copper-based heat stabilizers used in the polyamide composition described herein comprises at least one copper compound and preferably at least one alkali metal halide. The copper is present in the form of copper salts wherein the copper is selected from the group consisting of Cu(I), Cu(II), or a mixture thereof.

Cu(I) salts are preferred. Examples of copper heat stabilizers useful in the polyamide compositions include copper salts selected from the group consisting of copper iodide, copper bromide, copper chloride, copper fluoride; copper thiocyanate, copper nitrate, copper acetate, copper naphthenate, copper caprate, copper laurate, copper stearate, copper acetylacetonate, and copper oxide.

Preferred copper heat stabilizers include copper halides selected from copper iodide, copper bromide, copper chloride, and copper fluoride. A preferred copper species is copper iodide, and preferably copper (I) iodide. It is preferred that the copper heat stabilizer also include a metal halide selected from the group consisting of LiI, NaI, KI, $MgI_2$, KBr, and $CaI_2$ with KI or KBr being preferred.

Preferably, the copper-based heat stabilizer is a mixture of 5 to 50 weight percent copper salt, 50 to 95 weight percent of metal halide, and from 0 to 15 weight percent of a fatty acid salt, based on the total weight of the copper-based heat stabilizer. Even more preferably, the copper heat stabilizer is a mixture of 10 to 30 weight percent copper salt, 70 to 90 weight percent metal halide, and from 0 to 15 weight percent fatty acid salt, and most preferably the copper heat stabilizer is a mixture of 10 to 20 weight percent copper salt, 75 to 90 weight percent metal halide, and from 0 to 12 weight percent fatty acid salt, based on the total weight of the copper-based heat stabilizer. A preferred heat stabilizer is a mixture of copper iodide and potassium iodide (CuI/KI). The copper stabilizer useful in polyamide compositions described herein may also be blended or mixed with a fatty acid metal salt carrier material. An example of a fatty acid salt carrier material is aluminum distearate. An example of a suitable copper heat stabilizer is Polyadd P201, available from Ciba Specialty Chemicals of Basel, Switzerland, comprising a blend of 7:1:1 weight ratio of potassium iodide, cuprous iodide, and aluminum stearate respectively. Suitable stabilizers may include different weight ratios, from 7:1:1 up to 7:1:4 or 7:1:5, of potassium iodide, cuprous iodide, and aluminum stearate or other carrier material.

The one or more antioxidants or heat stabilizers present in the polyamide composition may range from about 0.1 to 3 weight percent, preferably from about 0.1 to 2 weight percent, more preferably from 0.1 to 1 weight percent and most preferably about 0.1 to 0.75 weight percent based on the total weight of all components (A) to (G) in the polyamide composition.

Preparation of Polyamide Compositions

The polyamide compositions described herein may be prepared by melt-blending in which all polymeric ingredients are adequately mixed, and all non-polymeric ingredients are adequately dispersed in the polyamide resin matrix. Any melt-blending method may be used for mixing polymeric ingredients and non-polymeric ingredients of the polyamide compositions. For example, polymeric ingredients and non-polymeric ingredients may be fed into a melt mixer, such as single screw extruder or twin screw extruder, agitator, single screw or twin screw kneader, or Banbury mixer, and the addition step may be addition of all ingredients at once or gradual addition in batches. When the polymeric ingredients and non-polymeric ingredients are gradually added in batches, a part of the polymeric ingredients or non-polymeric ingredients is first added, and then is melt-mixed with the remaining polymeric ingredients and non-polymeric ingredients that are subsequently added, until an adequately mixed composition is obtained.

Preferred processes include compounding on a twin screw extruder or a single screw extruder, such as a Buss kneader.

Articles

The polyamide compositions described herein are suitable for forming a variety of articles such as automotive parts, electric/electronic components and mechanical components. Some preferred articles are electrical connectors, because the polyamide composition has flame retardant properties, an excellent melt flow index, and excellent bar flow.

Figure 3:
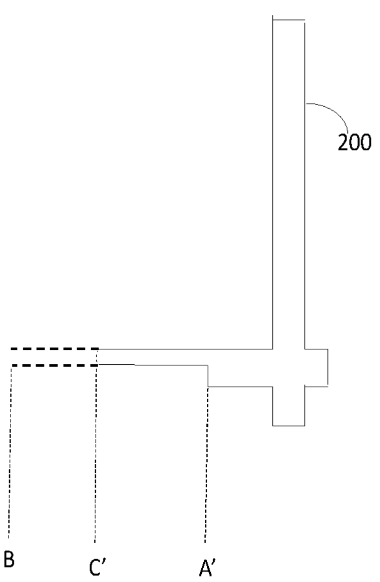
FIG. 3 is a cross-sectional view of a molded article upon its removal from the molding apparatus depicted in FIGS. 1, 1A, 2 and 2A.

Referring now to the drawings, wherein like reference numerals designate corresponding structure throughout the views, and referring in particular to FIG. 1, bar flow is measured by the flow length prepared by injection molding using the molding apparatus shown in FIGS. 1, 1A, 2, and 2A. The molded polyamide resin article 200 after removal from the molding apparatus is shown in FIG. 3. The injected composition spreads in the mold then arrives at the ejector pin. As a greater volume is injected into the mold, the molten composition expands and is diverted in a horizontal direction. The composition runs through a narrow opening with 0.2 mm thickness or diameter and with a length equal to the distance between the near gate side (A) and the far gate side (B) of the molding apparatus. Referring to FIG. 3, the distance between (A'), the part of molded article 200 that is shaped by the near gate side (A) of the molding apparatus, and the point (C') at which the molten composition ceased to flow through the narrow opening is measured. This distance is reported as the "Bar Flow" length. Still referring to FIG. 3, the length of the narrow opening between the point (C') at which the molten composition ceased to flow and the far gate side (B) of the molding apparatus is shown in dotted lines to indicate that this region is not part of the molded article 200.

The novel processes and polyamide compositions described herein are further defined by the following Examples. These examples set forth specific embodiments and a preferred mode presently contemplated for carrying out the invention. It is to be understood that these examples, while indicating certain preferred aspects of the disclosure, are given by way of illustration only and are not intended to limit the invention. Based upon the above discussion and these examples, one skilled in the art can ascertain the essential characteristics of this disclosure, and without departing from the spirit and scope thereof, can make various changes and modifications to adapt it to various uses and conditions.

Examples

The exemplary articles are identified by "E" in the tables below, and comparative examples are identified in the tables below by "C".

Materials

Polyamide (A)

PA(A)-1: poly(decamethylene terephthalamide) having a melt flow rate of 18 g/10 min measured at 330 C and at 1.2 kg load, according to ISO 1322-1:2011.

PA(A)-2: poly(decamethylene terephthalamide) having a melt flow rate of 46 g/10 min measured at 330 C and at 1.2 kg load.

Copolyamide (B)

PA(B)-1: poly(hexamethylene terephthalamide/hexamethylene decanediamide) having a molar ratio (PA6T/610) of 64/36 and an IV of 0.80

PA(B)-2: poly(hexamethylene terephthalamide/hexamethylene isophthalamide) having a molar ratio (PA6T/61) of 30/70 and IV of 0.73

PA(B)-3: poly(hexamethylene terephthalamide/hexamethylene hexanediamide) having a molar ratio (PA6T/66) of 55/45 and IV of 0.94

PA(B)-4: poly(hexamethylene terephthalamide/hexamethylene isophthalamide/caprolactamide) having a molar ratio (PA6T/6I/6) of 57/25/18 and IV of 0.87

Flame Retardant

FR-1: Exolit OP 1230, available from Clariant Specialty Chemicals of Muttenz, Switzerland.

Flame Retardant Synergist

FRS-A: boehmite flame retardant synergist available as BMT-33 from Kawai Lime Industry Co., Japan.

FRS-B: Zinc Borate flame retardant synergist available as Firebrake ZB from Chemtura, Philadelphia, PA, USA.

Reinforcing Agent

RA-1: A reinforcing agent comprising glass fibers having a diameter of 7 microns available as NEG 289DE from Nippon Electric Glass Co., Ltd., Shiga, Japan.

Lubricant

N-Stearyl Erucamide

Antioxidants

AO-1: Irganox 1098, available from BASF Corp. of Ludwigshafen, Germany

AO-2: Ultranox 626, available from Addivant of Danbury, CT

Compounding Method

The compositions set forth in the Tables, below, were made by combining the individual components and melt-mixing in a twin screw extruder, for example Model No. ZSK-32MC produced by Coperion GmbH of Stuttgart, Germany.

Test Methods

Flammability

Flammability was determined according to UL-94 vertical flammability test on 0.4 mm thick test bars. The flammability test was conducted upon test bars that were aged at 23° C./50% RH/48 hrs and 70° C./ambient RH/168 hrs.

Flowability

Flowability was measured by bar flow test with 0.2 mm thickness. Drawings of the molding apparatus are shown in FIGS. 1, 1A, 2, and 2A, and a drawing of the molded part is shown in FIG. 3. The resin composition was injection-molded in the apparatus at a 335° C. of melt temperature, a 140° C. of mold temperature, and 80 MPa of injection pressure. The molding apparatus includes a passage between the near gate side (A) and far gate side (B) which has a constant diameter or thickness of 0.2 mm. Upon removal from the mold and cooling to room temperature, the bar flow was measured by a caliper and reported as the distance on the molded part 200 between the near-gate side (A') and the point (C') at which the molten composition ceased to flow.

Tensile strength (TS), Elongation at Break (EB) and Tensile Modulus (TM).

The above three tests were determined according to ISO 527-1/-2.

Deflection Temperature Under Load (DTUL)

DTUL was determined according to ISO 75-1/-2.

Inherent viscosity (IV) was measured on a 0.5 wt % solution of polyamide in m-cresol at 25° C. according to ISO 307 (2007).

Freezing Point of the Compounded Compositions

Freezing points were measured by DSC. Samples were heated at 20° C./min to 350° C., held at 350° C. for 3 minutes, and then cooled at 10° C./min to room temperature. The measurements are graphed on energy uptake vs. temperature axes. The freezing point is the temperature of the maximum of the exothermic peak obtained during the cooling process.

TABLE 1

| | | C1 | E1 | E2 | E3 |
|---|---|---|---|---|---|
| PA(A) | 1 | 62.9 | 53.45 | 53.45 | 53.45 |
| | 2 | — | — | — | — |
| PA(B) | 1 | — | 9.45 | — | — |
| | 2 | — | — | 9.45 | — |
| | 3 | — | — | — | 9.45 |
| | 4 | — | — | — | — |
| FR | 1 | 14.5 | 14.5 | 14.5 | 14.5 |
| FRS | A | 2.25 | 2.25 | 2.25 | 2.25 |
| | B | 0.35 | 0.35 | 0.35 | 0.35 |
| RA | 1 | 20.0 | 20.0 | 20.0 | 20.0 |
| Lubricant | | 0.12 | 0.12 | 0.12 | 0.12 |
| Polymer (B) ratio | PA(B)*100/ (PA(A) + PA(B)) | — | 15 | 15 | 15 |
| Flammability | at 0.4 mm 23° C./50% RH/ 48 hr | V-0 | V-0 | V-0 | V-0 |
| | at 0.4 mm 70° C./168 hr | V-0 | V-0 | V-0 | V-0 |
| Bar Flow | 0.2 mm 80 MPa (mm) | 12 | 15 | 13 | 14 |
| Tensile Strength (MPa) | | 130 | 133 | 134 | 132 |
| Elongation at Break (%) | | 2.8 | 2.8 | 2.8 | 2.7 |
| Tensile Modulus (MPa) | | 7890 | 7960 | 7820 | 7950 |
| DTUL(degree C.) | | >300 | 282 | 281 | 282 |
| Freezing points (degree C.) | | 291 | 284 | 285 | 286 |

Table 1 shows the results of different polyamide compositions. The combination of PA(A)-1 and various PA(B) shows higher Bar Flow than PA(A)-1 (Comparative Example C1). In addition, the freezing points of Examples E1, E2 and E3 were lower than that of Comparative Example C1, which indicated decreasing crystallization temperature of the polyamide compositions.

TABLE 2

| | | C2 | E4 | E5 | E6 | E7 | E8 | E9 |
|---|---|---|---|---|---|---|---|---|
| PA(A) | 1 | — | — | — | — | — | — | — |
| | 2 | 61.56 | 59.72 | 58.48 | 55.40 | 52.16 | 42.76 | 36.94 |
| PA(B) | 1 | — | 1.85 | 3.08 | 6.16 | 9.40 | 18.80 | 24.62 |
| | 2 | — | — | — | — | — | — | — |
| | 3 | — | — | — | — | — | — | — |
| | 4 | — | — | — | — | — | — | — |
| FR | 1 | 15.5 | 15.5 | 15.5 | 15.5 | 15.5 | 15.5 | 15.5 |
| FRS | A | 2.55 | 2.55 | 2.55 | 2.55 | 2.55 | 2.55 | 2.55 |
| | B | 0.39 | 0.39 | 0.39 | 0.39 | 0.39 | 0.39 | 0.39 |
| RA | 1 | 20.0 | 20.0 | 20.0 | 20.0 | 20.0 | 20.0 | 20.0 |
| Lubricant | | 0.12 | 0.12 | 0.12 | 0.12 | 0.12 | 0.12 | 0.12 |
| Polymer (B) ratio | PA(B)/(PA(A) + PA(B))*100 | — | 3 | 5 | 10 | 15 | 31 | 40 |
| Flam- | at 0.4 mm 23° C./ | V-0 | V-0 | V-0 | V-0 | V-0 | V-0 | V-0 |

TABLE 2-continued

| | | C2 | E4 | E5 | E6 | E7 | E8 | E9 |
|---|---|---|---|---|---|---|---|---|
| mability | 50% RH/48 hr at 0.4 mm 70° C./168 hr | V-0 | V-0 | V-0 | V-0 | V-0 | V-0 | V-0 |
| Bar Flow | 0.2 mm 80 MPa (mm) | 14.1 | 15.2 | 16.5 | 17.1 | 17.0 | 18.5 | 18.8 |
| Tensile Strength (MPa) | | 127 | 126 | 128 | 128 | 130 | 128 | 130 |
| Elongation at Break (%) | | 2.7 | 2.6 | 2.7 | 2.6 | 2.7 | 2.5 | 2.6 |
| Tensile Modulus (MPa) | | 7950 | 8060 | 8100 | 8100 | 7860 | 8230 | 8210 |
| DTUL(degree C.) | | >300 | — | 294 | 394 | — | 274 | 272 |
| Freezing point (degree C.) | | 292 | 291 | 290 | 288 | — | 277 | 276 |

Table 2 shows the results for various weight ratios of PA(A)-2 to PA(B)-1. Examples E4 to E9 show better Bar Flow than that of PA(A)-2 (Comparative Example C2). Notably, Examples E5 to E8 show higher Bar Flow than Comparative Example C2, as shown in Table 2.

TABLE 3

| | | C3 | E10 | E11 | E12 |
|---|---|---|---|---|---|
| PA(A) | 1 | — | — | — | — |
| | 2 | 33.86 | 42.76 | 42.76 | 41.27 |
| PA(B) | 1 | 27.70 | — | — | 18.50 |
| | 2 | — | — | — | — |
| | 3 | — | 18.80 | — | |
| | 4 | — | — | 18.80 | — |
| FR | 1 | 15.5 | 15.5 | 15.5 | 16.5 |
| FRS | A | 2.55 | 2.55 | 2.55 | 2.71 |
| | B | 0.39 | 0.39 | 0.39 | 0.42 |
| RA | 1 | 20.0 | 20.0 | 20.0 | 20.0 |
| AO | 1 | | | | 0.2 |
| | 2 | | | | 0.4 |
| Lubricant | | 0.12 | 0.12 | 0.12 | 0.12 |
| Polymer (B) ratio | PA(B)/(PA(A) + PA(B))*100 | 45 | 31 | 31 | 31 |
| Flammability | at 0.4 mm 23° C./50% RH/48 hr | V-0 | V-0 | V-0 | V-0 |
| | at 0.4 mm 70° C./168 hr | V-0 | V-0 | V-0 | V-0 |
| Bar Flow | 0.2 mm 80 MPa (mm) | 19.8 | 17.0 | 16.0 | 18.4 |
| Tensile Strength (MPa) | | 129 | 130 | 130 | 126 |
| Elongation at Break (%) | | 2.5 | 2.5 | 2.6 | 2.4 |
| Tensile Modulus (MPa) | | 8170 | 7980 | 7820 | 7990 |
| DTUL(degree C.) | | 268 | 277 | 277 | 274 |
| Freezing point (degree C.) | | 264 | 283 | 285 | 279 |

Table 3 shows the results of the combination of PA(A)-2 and various PA(B)s. These combinations show higher Bar Flow than PA(A)-2 (Comparative Example C2) shown in Table 2. Notably, the freezing point of Example E10 was lower than that of Comparative Example C2. Comparative Example C3 was characterized by a significantly lower freezing point. Without wishing to be held to theory, it is hypothesized that this lower freezing point will result in slower crystallization rate and therefore a longer molding cycle.

Example E12 was prepared using the same methods as Examples E1 through E11. The composition of Example E12 included an antioxidant package and is otherwise substantially similar to that of Example E10. Accordingly, the properties of Example E12 are expected to be substantially similar to those of Example E10, with some relative increase in heat stability.

While certain of the preferred embodiments of this invention have been described and specifically exemplified above, it is not intended that the invention be limited to such embodiments. Various modifications may be made without departing from the scope and spirit of the invention, as set forth in the following claims.

The invention claimed is:

1. A polyamide composition comprising:

A) 10 to 80 wt % of a 1,10-decanediamine terephthalamide (10T) homopolymer;

B) 0.5 to 40 wt % of a copolyamide comprising repeating units derived from terephthalic acid and from a diamine containing 6 or fewer carbon atoms, wherein the copolyamide comprises repeating units derived from hexamethylene decanediamide;

C) 0 to 25 wt % of a flame retardant;

D) 0 to 5 wt % of at least one flame retardant synergist;

E) 1 to 40 wt % of a reinforcing agent;

F) 0 to 2 wt % of a lubricant; and

G) 0 to 25 wt % of one or more additional additives;

wherein the weight percentages are based on the total weight of the polyamide composition; and wherein the sum of the weight percentages of components (A), (B), (C), (D), (E), (F), and (G) in the polyamide composition is 100 wt %.

2. The polyamide composition of claim 1, wherein the content of the repeating units derived from a diamine containing 6 or less carbon atom and terephthalic acid in the copolyamide (B) is from 0.2 to 0.75 by molar ratios based on the total number of moles of repeating units in copolyamide (B).

3. The polyamide composition of claim 1, wherein the ratio of the weight of copolyamide (B) to the total weight of polyamide (A) and copolyamide (B) ranges from 5 to 35 weight %.

4. The polyamide composition of claim 1, wherein the flame retardant synergist is present and comprises one or more metal oxides selected from the group consisting of silica oxide, boehmite, aluminum oxide, iron oxide, titanium oxide, manganese oxide, magnesium oxide, zirconium oxide, zinc oxide, molybdenum oxide, cobalt oxide, bismuth oxide, chromium oxide, tin oxide, antimony oxide, nickel oxide, copper oxide and tungsten oxide.

5. The polyamide composition of claim 1, comprising one or more optional additives (G) selected from the group consisting of pigments, and heat stabilizers.

6. An article comprising the polyamide composition of claim 1.

7. The article of claim 6 in the form of an electrical connector.

8. A polyamide composition comprising:

A) 25 to 65 wt % of 1,10-decanediamine terephthalamide (10T) homopolymer, said polyamide having a melt index ranging from about 40 to 80 g/10 min as measured at 330° C. and at 1.2 kg load according to ISO1133-1:2011;

B) 2 to 20 wt % of a copolyamide comprising repeat units derived from terephthalic acid and from a diamine containing 6 or fewer carbon atoms, wherein the copolyamide comprises repeating units derived from hexamethylene decanediamide;

C) 10 to 25 wt % of a flame retardant;

D) 0.1 to 5 wt % of at least one flame retardant synergist;

E) 10 to 45 wt % of a reinforcing agent;

F) 0.01 to 1 wt % of a lubricant; and

G) 0 to 25 wt % of one or more optional additional additives;

wherein the total amount of component (A) and component (B) is 30 to 65 wt %; wherein the ratio of the weight of component (B) to the total weight of (component (A)+component (B)) calculated as wt % is 5 to 30; wherein the weight percentages of each component (A), (B), (C), (D), (E), (F), and (G) are based on the total weight of the polyamide composition; and wherein the sum of the weight percentages of components (A), (B), (C), (D), (E), (F), and (G) in the polyamide composition is 100 wt %.

9. The composition of claim 8, comprising one or more optional additives (G) selected from the group consisting of pigments, and heat stabilizers.

10. An article comprising the polyamide composition of claim 8.

11. The article of claim 10 in the form of an electrical connector.

* * * * *